(12) United States Patent
Durocher et al.

(10) Patent No.: US 8,944,749 B2
(45) Date of Patent: Feb. 3, 2015

(54) OIL PURGE SYSTEM FOR A MID TURBINE FRAME

(75) Inventors: Eric Durocher, Vercheres (CA); John Pietrobon, Outremont (CA); Zenon Szlanta, Brossard (CA); Roger Huppe, Chambly (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 572 days.

(21) Appl. No.: 13/356,701

(22) Filed: Jan. 24, 2012

(65) Prior Publication Data

US 2013/0189071 A1    Jul. 25, 2013

(51) Int. Cl.
   *F01D 25/18*    (2006.01)
(52) U.S. Cl.
   USPC ............ 415/1; 415/111; 415/168.1; 184/6.11
(58) Field of Classification Search
   CPC ....... F01D 9/065; F01D 25/18; F01D 25/162; F01D 25/183
   USPC ............... 415/1, 110, 111, 142, 168.1, 170.1, 415/229; 184/6.11, 55.1, 55.2, 11.2
   See application file for complete search history.

(56) References Cited

U.S. PATENT DOCUMENTS

| | | | |
|---|---|---|---|
| 3,556,444 A | 1/1971 | Kopp | |
| 3,612,577 A | 10/1971 | Pope et al. | |
| 4,163,366 A | 8/1979 | Kent | |
| 4,185,462 A | 1/1980 | Morse, II et al. | |
| 4,344,506 A | 8/1982 | Smith | |
| 5,197,766 A | 3/1993 | Glover et al. | |
| 5,263,312 A | 11/1993 | Walker et al. | |
| 5,996,938 A | 12/1999 | Simonetti | |
| 6,102,577 A * | 8/2000 | Tremaine | 384/493 |
| 6,330,790 B1 | 12/2001 | Arora et al. | |
| 7,743,598 B2 | 6/2010 | Bart et al. | |
| 7,967,560 B2 | 6/2011 | DiBenedetto | |
| 2010/0275572 A1 | 11/2010 | Durocher et al. | |
| 2011/0085895 A1* | 4/2011 | Durocher et al. | 415/178 |

* cited by examiner

*Primary Examiner* — Edward Look
*Assistant Examiner* — Juan G Flores
(74) *Attorney, Agent, or Firm* — Norton Rose Fulbright Canada LLP

(57) ABSTRACT

An oil purge system for a mid turbine frame (MTF) of a gas turbine engine has an oil transfer tube surrounded by a heat shield tube. The oil transfer and heat shield tubes extend at their respective inner ends downwardly from an oil port of a bearing housing and terminate at their respective outer ends projecting outwardly from an annular wall of an outer case of the MTF. Oil leaked from the oil port is purged by pressurized air through an annular cavity formed between the oil transfer and heat shield tubes, and is discharged out of the MTF.

19 Claims, 5 Drawing Sheets

OIL PURGE SYSTEM FOR A MID TURBINE FRAME

TECHNICAL FIELD

The described subject matter relates generally to gas turbine engines, and more particularly, to an oil purge system for a mid turbine frame.

BACKGROUND OF THE ART

A mid turbine frame (MTF) system of a gas turbine engine sometimes referred to as an "inter-turbine frame", is located generally between a high pressure turbine stage and a low pressure turbine stage of a gas turbine engine, to support one or more bearings and to transfer bearing loads therethrough to an outer engine case, and also to form an inter-turbine duct (ITD) for directing hot gas flow to the downstream rotor. It is conventional to have an oil transfer tube to radially pass the ITD in order to deliver oil to or discharge oil from the bearings. Oil leakage may occur from a seal located between the oil transfer tube and an oil port of a bearing housing. The leaked oil may enter into a high pressure turbine and/or low pressure turbine disk hub cavities and possibly ignite due to the high temperature environment in the cavities.

Accordingly, there is a need to solve this problem.

SUMMARY

In one aspect, the described subject matter provides gas turbine engine having a mid turbine frame, the mid turbine frame comprising: a bearing housing and an annular outer case connected together by a plurality of radial struts; an annular inter-turbine duct disposed radially between the annular bearing housing and the annular outer case for conducting hot gases axially through the mid turbine frame, the annular inter-turbine duct defining a plurality of radial hollow strut fairings extending therethrough; and an oil transfer tube and a heat shield tube around the oil transfer tube defining an annular cavity therebetween, the heat shield tube being substantially surrounded by pressurized air, the oil transfer and heat shield tubes being received at a respective inner end thereof in an oil port of the bearing housing and extending radially downwardly through a radial passage of the annular inter-turbine duct and through an opening in the outer case, the oil transfer and heat shield tubes terminating at a respective outer end thereof projecting outwardly from an annular wall of the outer case, the outer end of the oil transfer tube being configured for fluid connection with an oil system, the annular cavity being in fluid communication with the pressurized air through a first passage located in a position adjacent the inner end of the heat shield tube, the annular cavity being in fluid communication with a second passage located outside the annular wall of the outer case, the second passage being configured for fluid connection with a leaked-oil dumping area located outside the outer case.

In another aspect, the described subject matter provides a method for purging oil leakage from a mid turbine frame of a gas turbine engine, the mid turbine frame including at least a bearing housing and an annular outer case connected together by a plurality radial struts, and an annular inter-turbine duct disposed between the bearing housing and the outer case for conducting hot gases, the method comprising: a) providing a heat shield tube around an oil transfer tube to create an annular cavity therebetween, the cavity extending radially downwardly from a port of the bearing housing and terminating outside the outer case to allow oil leaked from between the bearing housing port and the oil transfer tube to drain into the cavity; b) introducing pressurized air into the cavity adjacent the port of the bearing housing for purging the leaked oil down along the cavity and out of the outer case of the mid turbine frame; and c) directing the leaked oil purged from the cavity into a leaked-oil dumping area of the engine.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
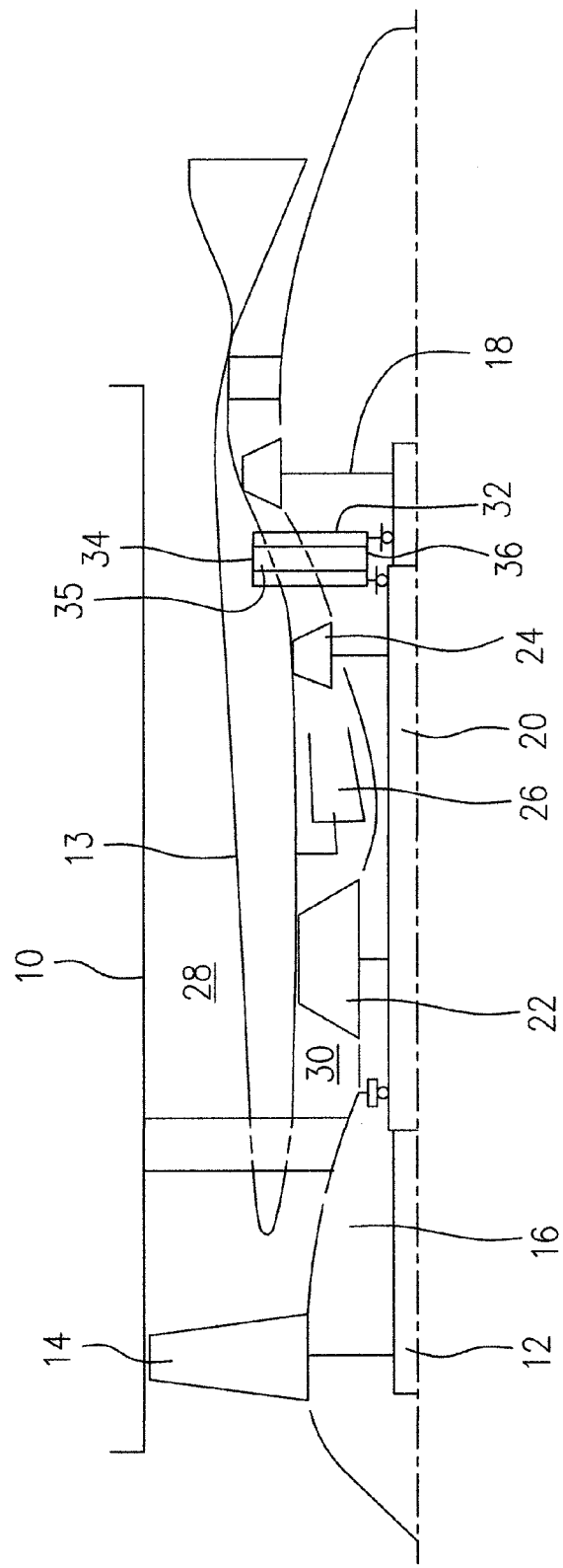
FIG. 1 is a schematic cross-sectional view of a turbofan gas turbine engine as an exemplary application of the described embodiments.

Referring to FIG. 1, a turbofan bypass engine includes a housing or nacelle 10, a core cowl 13, a low pressure spool assembly (not numbered) which includes a fan assembly 14, a low pressure compressor assembly 16 and a low pressure turbine assembly 18 connected by shaft 12, and a high pressure spool assembly (not numbered) which includes a high pressure compressor assembly 22 and a high pressure turbine assembly 24 connected by a turbine shaft 20. The housing or nacelle 10 surrounds the core cowl 13 and in combination with the core cowl 13 defines an annular bypass air duct 28 for directing a bypass airflow to be discharged, thereby providing thrust to the engine. The core cowl 13 surrounds the low and high pressure spool assemblies to define a core fluid path 30 therethrough. In the core fluid path 30 there is provided a combustor 26 to form a combustion gas generator assembly which generates combustion gases to power the high pressure turbine assembly 24 and the low pressure turbine assembly 18. A mid turbine frame 32 is disposed between the high pressure turbine assembly 24 and the low pressure turbine assembly 18 and supports bearings (not numbered) around the respective shafts 20 and 12.

Figure 2:
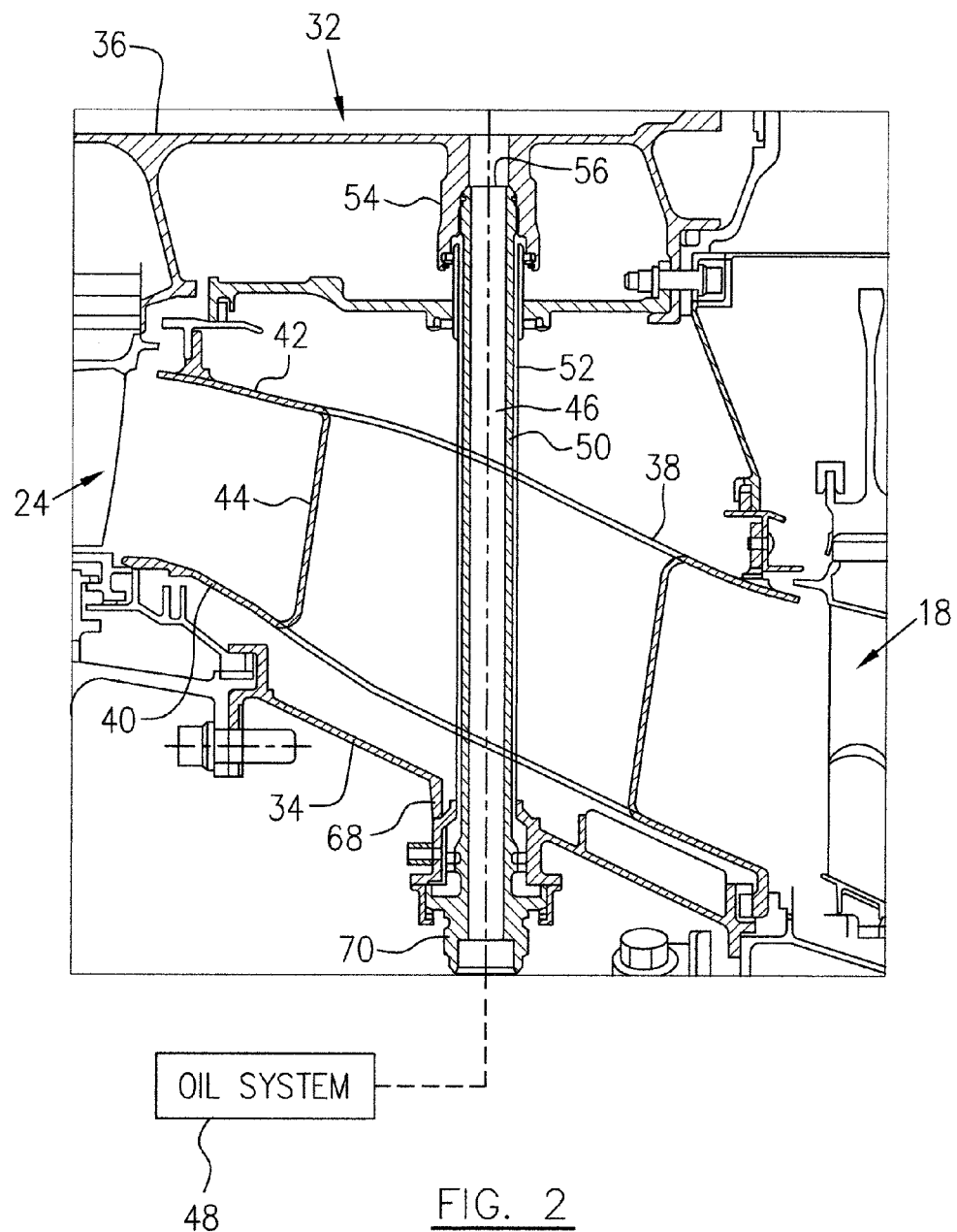
FIG. 2 is a partial cross-sectional view of a mid turbine frame having an oil purge system according to one embodiment.
Figure 3:
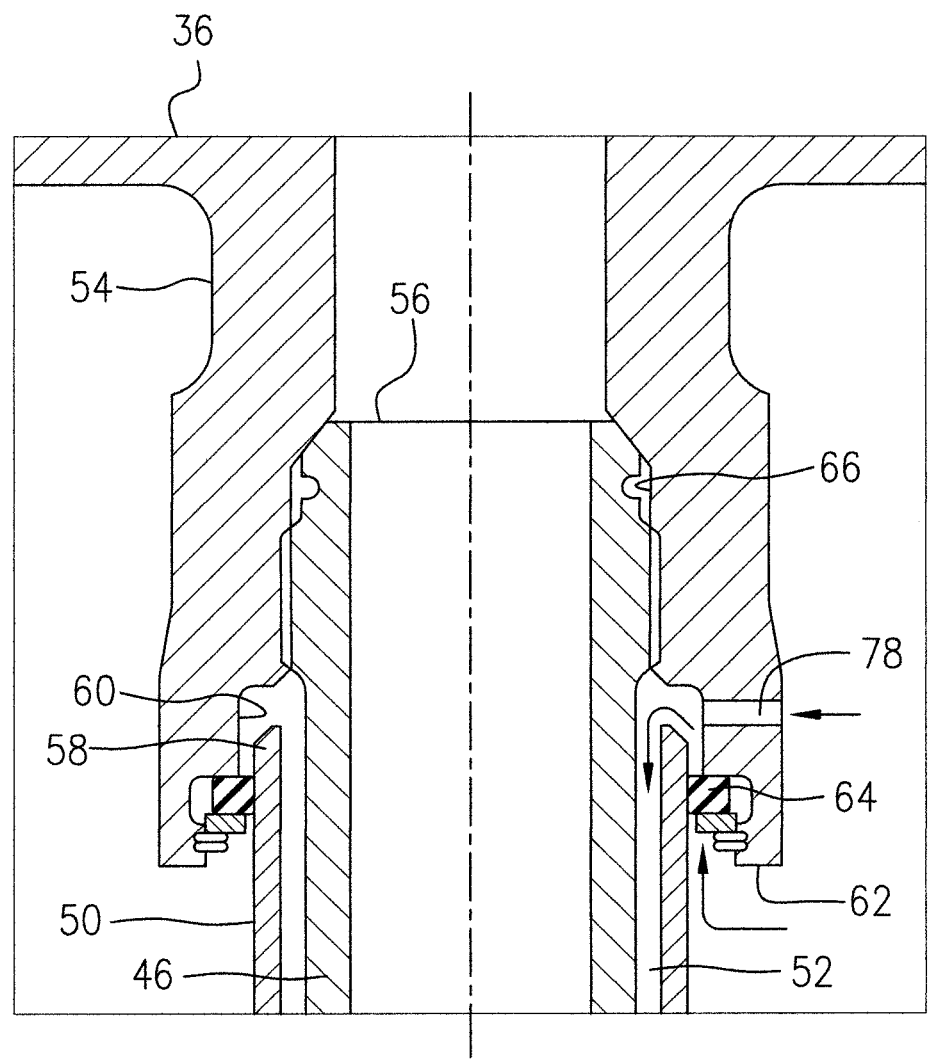
FIG. 3 is a partial cross-sectional view of the mid turbine frame of FIG. 2 in an enlarged scale, showing respective inner ends of oil transfer and heat shield tubes received in an oil port of a bearing housing.
Figure 4:
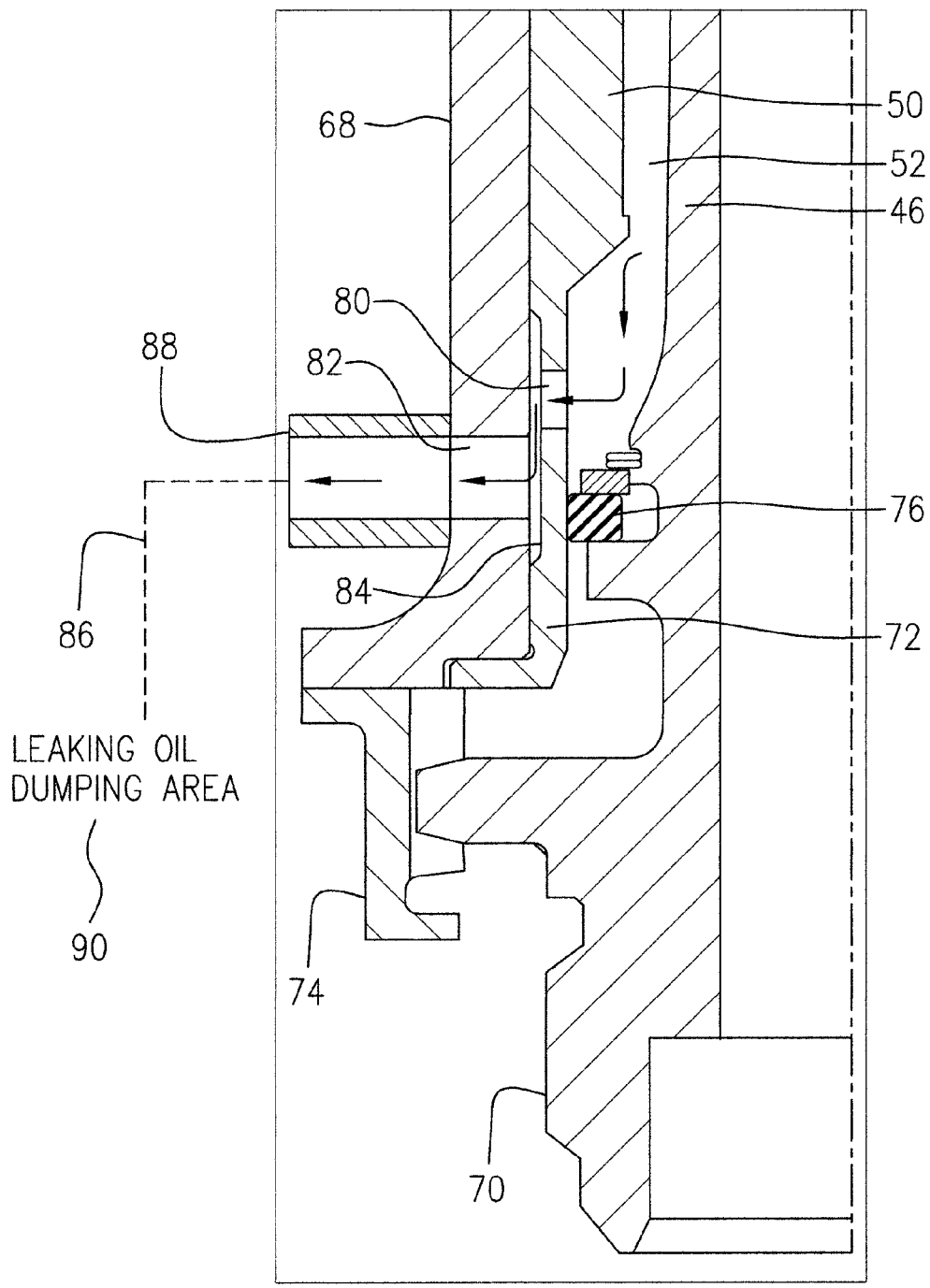
FIG. 4 is a partial cross-sectional view of the mid turbine frame of FIG. 2 in an enlarged scale, showing a respective outer end of the oil transfer and heat shield tubes extending through a boss of an outer case of the mid turbine frame.

Referring to FIGS. 1 and 2, the mid turbine frame 32 includes an annular outer case 34 which has mounting flanges (not numbered) at both axial ends thereof, for connection with other components of the respective high and low pressure turbine assemblies 24, 18 which together with the annular outer case 34, form part of the core cowl 13 of the engine. A bearing housing 36 is disposed within the outer case 34 and is connected to the outer case 34 by a plurality of radial struts 35 (see FIG. 1). The mid turbine frame 32 further includes an inter-turbine duct (ITD) 38 disposed within and supported by the outer case 34. The ITD 38 includes coaxial outer and inner rings 40 and 42 radially spaced apart and interconnected by a plurality of radial hollow strut fairings 44 which align with respective openings (not numbered) defined in the respective outer and inner rings 40, 42. The radial hollow strut fairings 44 form radial passages to allow the respective radial struts 36 to radially extend through the ITD 38 and may also provide radial passages for other engine components such as various service lines to pass through the ITD 38.

An oil transfer tube 46 is provided for fluid connection between the bearing housing 36 and an oil system 48 of the engine to transfer oil to or from the bearing housing 36. In one embodiment, the oil transfer tube 36 is surrounded by a heat shield tube 50, defining an annular cavity 52 between the oil transfer tube 46 and the heat shield tube 50. The oil transfer tube 46 together with the surrounding heat shield tube 50 as well as the annular cavity 52 defined therebetween, extends radially downwardly from the bearing housing 36 to pass through a radial passage such as the radial passage formed by one of the hollow strut fairings 44 of the ITD 38 and then through an opening (not numbered) defined in the outer case 34, terminating outside of an annular wall (not numbered) of the outer case 34. The heat shield tube 50 and the annular cavity 52, both surrounding the oil transfer tube 46, not only provide a heat insulation for the oil transfer tube 46 but also form an oil purge system for the mid turbine frame 32, which will be further described hereinafter.

Referring to FIGS. 1-4 and according to one embodiment, the bearing housing 36 has an oil port 54 for sealingly receiving an inner end 56 of the oil transfer tube 46 and an inner end 58 of the heat shield tube 50. The oil port 54 of the bearing housing 36 may be configured with a cylindrical wall (not numbered) having an inner surface 60 adjacent an entry end 62 of the oil port 54, for sealingly receiving the inner end 58 of the heat shield tube 50 with, for example an annular seal 64 disposed therebetween. The cylindrical wall of the oil port 54 may further have an annular inner surface 66 adjacent the annular inner surface 60 for sealingly receiving the inner end 56 of the oil transfer tube 46.

In one embodiment, the outer case 34 may include a boss 68 projecting radially outwardly from the annular wall of the outer case 34. The opening defined in the outer wall of the outer case 34 extends radially outwardly through the boss 68 such that an outer end 70 of the oil transfer tube 46 and an outer end 72 of the heat shield tube 50 can extend through the opening of the boss 68 to project radially outwardly from the annular wall of the outer case 34. The outer end 72 of the heat shield tube 50 may be sealingly received in the opening of the boss 68. The outer end 70 of the oil transfer tube 46 extends outwardly from the outer end 72 of the heat shield tube 50 and is supported in the boss 68, for example by a retaining component 74. The outer end 70 of the oil transfer tube 46 is configured for connection with the oil system 48. An annular seal 76 may be provided within the opening of the boss 68, between the oil transfer tube 46 and the heat shield tube 50 adjacent to the outer end 72 of the heat shield tube 50.

The annular cavity 52 is located below the oil port 54 and therefore any oil leaked from between the inner end 56 of the oil transfer tube 46 and the oil port 54 will drain into the annular cavity 52. The leaked oil being drained into the annular cavity 52 will be further purged out of the mid turbine frame 32, by a pressurized air flow along the annular cavity 52, which will be further described hereinafter.

The outer case 34 and the bearing housing 36 define an annular space radially therebetween which is in fluid communication with a source of pressurized air such as P3 air. The pressurized air surrounds the heat shield tube 50 and the oil port 54. The annular seal 64 positioned between the heat shield tube 50 and the annular surface 60 of the cylindrical wall of the oil port 54, allows a small clearance to form a first passage such that the pressurized air surrounding the heat shield tube 50 and the oil port 54, can restrictively enter into the annular cavity 52 from the inner end 58 of the heat shield tube 50. Optionally, one or more holes 78 may be provided in the oil port 54, extending through the cylindrical wall. The one or more holes 78 in combination with the clearance provided by the seal 64, form the restrictive passage to allow a more selected volume of pressurized air to create an air flow as shown by the arrows in FIG. 3 with a selected velocity for purging the leaked oil through the annular cavity 52.

Alternatively, at least one of the radial struts 35 (see FIG. 1) extending between the outer case 34 and the bearing housing 36, through the hollow radial strut fairings 44 of the ITD 38, is hollow and aligns with the oil port 54 of the bearing housing 36. Therefore, the oil transfer tube 46 and surrounding heat shield tube 50 may extend through such a hollow radial strut 35. In such a case, the hollow strut 35 is in fluid communication with the source of pressurized air to provide pressurized air surrounding the heat shield tube 50 and the oil port 54 to further enter into the annular cavity 52.

The heat shield tube 50 may be further provided with one or more holes 80 adjacent to the outer end 72 of the heat shield tube 50 and above the annular seal 76. The boss 68 of the outer case 34 may also be provided with a hole 82 which is in fluid communication with the one or more holes 80 in the heat shield tube 50, for example through an annular groove 84 on the annular outer surface (not numbered) of the outer end 72 of the heat shield tube 50, to thereby form an second passage for discharging the purged air flow carrying the leaked oil, away from the annular cavity 52 as indicated by the arrows in FIG. 4. A leaked-oil line 86 may be connected to a fitting 88 affixed to the hole 82 of the boss 68, for directing the leaked oil purged from the mid turbine frame 32, to a leaked-oil dumping area 90 of the engine located for example in the core cowl 13, in the bypass duct 28, or in a turbine exhaust case (not numbered) as shown in FIG. 1, or in engine-oil drain lines (not shown) through bypass service fairings.

Figure 5:
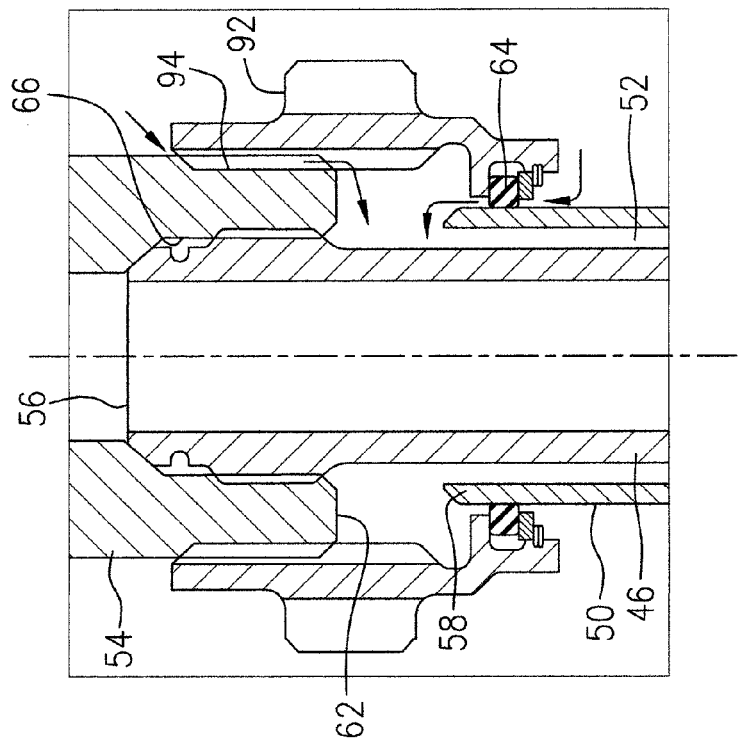
FIG. 5 is a partial cross-sectional view of the mid turbine frame of FIG. 2 in an enlarged scale, showing the connection of the respective inner end of the oil transfer and heat shield tubes to the oil port according to another embodiment.

Referring to FIGS. 2 and 5 and according to another embodiment, the oil port 54 of the bearing housing 36 may receive only the inner end 56 of the oil transfer tube 46. In contrast to the embodiment illustrated in FIG. 3, the cylindrical wall of the oil port 54 in this embodiment, does not have the annular inner surface 60 for receiving the heat shield tube 50, but may include only the annular inner surface 66 which is therefore immediately adjacent the entry end 62 of oil port 54, for sealingly receiving the inner end 56 of the oil transfer tube 46. A telescoping nut 92 with inner threads (not numbered) may be provided to threadingly engage threads on an annular outer surface 94 of the oil port 54. The telescoping nut 92 may extend downwardly from the entry end 62 of the oil port 54, to form a telescoping structure for receiving the outer end 58 of the heat shield tube 50 in a low end of the telescoping nut 92. The annular seal 64 may be disposed between the heat shield tube 50 and the telescoping nut 92 with a desired small clearance. Locking components (not shown) may be provided to lock the telescoping nut 92 in the connected position on the oil port 54. The first passage for restrictively introducing pressurized air surrounding the heat shield tube 50 and the oil port 54 into the annular cavity 52, may be formed by the desired small clearance provided by the annular seal 64 and clearances through the threading engagement between the telescoping nut 92 and the oil port 54, as indicated by the arrows in FIG. 5.

Figure 6:
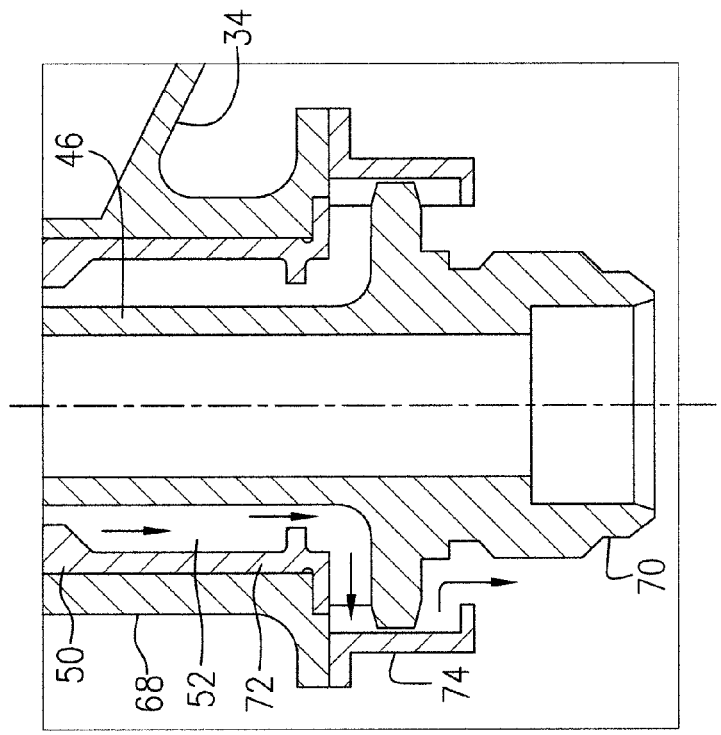
FIG. 6 is a partial cross-sectional view of the mid turbine frame of FIG. 2 in an enlarged scale, showing the respective outer end of the oil transfer and heat shield tubes extending through the outer case of the mid turbine frame according to a further embodiment.

Referring to FIGS. 2 and 6 and according to a further embodiment, no annular seal may be provided between the oil transfer tube 46 and the heat shield tube 50 adjacent to the outer end 72 of the heat shield tube 50 such that the annular cavity 52 defines a low open end positioned outside of the annular wall of the outer case 34 of the mid turbine frame 32, to allow the purged air flow carrying leaked oil, to drain downwardly therethrough as indicated by the arrows in FIG. 6, directly into a location of the engine core cowl 13 (see FIG. 1) such as an engine core cowl compartment (not shown) immediately below the heat shield tube 50. Therefore, this embodiment does not require holes to be drilled through the respective heat shield tube 50 and the outer case boss 68 forming a second passage to discharge the purged air flow with leaked oil. The second passage may be formed by the low open end of the annular cavity 52.

The above description is meant to be exemplary only, and one skilled in the art will recognize that changes may be made to the embodiments described without departure from the scope of the described subject matter. For example, the turbofan gas turbine engine as illustrated and described is an exemplary application of the described subject matter, but engines of other types may also be suitable for the described subject matter. The described mid turbine frame is also an exemplary application of the described oil purge system and may be modified for example, by adding or removing components and features. The oil transfer and heat shield tubes may extend through radial passages formed in the ITD rather than in the hollow strut fairings of the ITD. The features described in various embodiments may be combined in various ways. Still other modifications which fall within the scope of the described subject matter will be apparent to those skilled in the art, in light of a review of this disclosure, and such modifications are intended to fall within the appended claims.

The invention claimed is:

1. A gas turbine engine having a mid turbine frame, the mid turbine frame comprising:
a bearing housing and an annular outer case connected together by a plurality of radial struts;
an annular inter-turbine duct disposed radially between the annular bearing housing and the annular outer case for conducting hot gases axially through the mid turbine frame, the annular inter-turbine duct defining a plurality of radial hollow strut fairings extending therethrough; and
an oil transfer tube and a heat shield tube around the oil transfer tube defining an annular cavity therebetween, the heat shield tube being substantially surrounded by pressurized air, the oil transfer and heat shield tubes being received at a respective inner end thereof in an oil port of the bearing housing and extending radially downwardly through a radial passage of the annular inter-turbine duct and through an opening in the outer case, the oil transfer and heat shield tubes terminating at a respective outer end thereof projecting outwardly from an annular wall of the outer case, the outer end of the oil transfer tube being configured for fluid connection with an oil system, the annular cavity being in fluid communication with the pressurized air through a first passage located in a position adjacent the inner end of the heat shield tube, the annular cavity being in fluid communication with a second passage located outside the annular wall of the outer case, the second passage being configured for fluid connection with a leaked-oil dumping area located outside the outer case.

2. The gas turbine engine as defined in claim 1 wherein the oil port of the bearing housing comprises a first annular inner surface adjacent an entry end of the oil port for sealingly receiving the inner end of the heat shield tube, and a second annular inner surface adjacent the first annular inner surface for sealingly receiving the inner end of the oil transfer tube.

3. The gas turbine engine as defined in claim 1 wherein the oil port of the bearing housing comprises an annular inner surface adjacent an entry end of the oil port for sealingly receiving the inner end of the oil transfer tube and a telescoping nut threadingly engaging an annular outer surface adjacent the entry end of the oil port, the telescoping nut extending downwardly from the entry end of the oil port for sealingly receiving the outer end of the heat shield tube.

4. The gas turbine engine as defined in claim 1 wherein the mid turbine frame comprises a first annular seal positioned between the heat shield tube and the oil port of the bearing housing to provide a clearance between the first annular seal and the heat shield tube to form said first passage.

5. The gas turbine engine as defined in claim 1 wherein the oil port of the bearing housing comprises a cylindrical wall extending radially downwardly from the bearing housing, the cylindrical wall defining at least one hole extending therethrough and the at least one hole forming said first passage to restrictively allow the pressurized air surrounding the heat shield tube into the annular cavity.

6. The gas turbine engine as defined in claim 1 wherein the second passage is formed by an open end of the annular cavity at the outer end of the heat shield tube, the open end being in fluid communication with a location in an engine core cowl below the outer end of the heat shield tube.

7. The gas turbine engine as defined in claim 1 wherein the opening in the outer case extends through a boss radially outwardly projecting from the annular wall of the outer case, the opening of the boss sealingly receiving the outer end of the heat shield tube.

8. The gas turbine engine as defined in claim 7 wherein a second annular seal is positioned within the opening of the boss, between the oil transfer tube and the heat shield tube for sealing a low end of the annular cavity.

9. The gas turbine engine as defined in claim 8 wherein the second passage comprises at least one hole extending through the heat shield tube above the second annular seal, the at least one hole being in fluid communication with a hole extending through an annular wall of the boss.

10. The gas turbine engine as defined in claim 9 wherein the heat shield tube defines an annular groove on an outer surface adjacent the outer end, to form an annular space between the annular wall of the boss and the heat shield tube, the annular space being in fluid communication with the at least one hole extending through the heat shield tube and the hole extending through the annular wall of the boss.

11. The gas turbine engine as defined in claim 1 wherein the radial struts extend through respective radial hollow strut fairings of the inter-turbine duct and at least one of the struts is hollow, the oil transfer and heat shield tubes extending through the at least one of the hollow struts.

12. The gas turbine engine as defined in claim 1 comprising a leaked-oil line in fluid communication with the second passage and a bypass air duct of the engine.

13. The gas turbine engine as defined in claim 1 comprising a leaked-oil line in fluid communication with a turbine exhaust case.

14. A method for purging oil leakage from a mid turbine frame of a gas turbine engine, the mid turbine frame including at least a bearing housing and an annular outer case connected together by a plurality of radial struts, and an annular inter-turbine duct disposed between the bearing housing and the outer case for conducting hot gases, the method comprising:

a) providing a heat shield tube around an oil transfer tube to create an annular cavity therebetween, the cavity extending radially downwardly from an oil port of the bearing housing and terminating outside the outer case to allow oil leaked from between the bearing housing oil port and the oil transfer tube to drain into the cavity;

b) introducing pressurized air into the cavity adjacent the oil port of the bearing housing for purging the leaked oil down along the cavity and out of the outer case of the mid turbine frame; and c) directing the leaked oil purged from the cavity into a leaked-oil dumping area of the engine.

15. The method as defined in claim 14 wherein step (b) is performed by providing a first passage to restrictively allow pressurized air surrounding the heat shield tube to enter the cavity at a predetermined velocity.

16. The method as defined in claim 14 wherein step (b) is performed by providing a second passage defined in a structure located outside an annular wall of the outer case, the second passage being in fluid communication with the cavity to allow the purged leaked oil from the cavity out of the mid turbine frame.

17. The method as defined in claim 14 wherein in step (c) the purged leaked oil is directed into a location of an engine core cowl below the heat shield tube.

18. The method as defined in claim 14 wherein in step (c) the purged leaked oil is directed into an engine bypass air duct.

19. The method as defined in claim 14 wherein in step (c) the purged leaked oil is directed into a turbine exhaust case.

* * * * *